(12) United States Patent
Marsh et al.

(10) Patent No.: US 7,536,271 B2
(45) Date of Patent: May 19, 2009

(54) METHODS AND SYSTEMS FOR MANUFACTURING LARGE COMPONENTS

(75) Inventors: Bobby J. Marsh, Lake Stevens, WA (US); Steven H. Nichols, Auburn, WA (US)

(73) Assignee: The Boeing Company, Chicago, IL (US)

( * ) Notice: Subject to any disclaimer, the term of this patent is extended or adjusted under 35 U.S.C. 154(b) by 126 days.

(21) Appl. No.: 11/757,739

(22) Filed: Jun. 4, 2007

(65) Prior Publication Data
US 2008/0300823 A1 Dec. 4, 2008

(51) Int. Cl.
*G06F 19/00* (2006.01)
(52) U.S. Cl. ..................................... 702/150
(58) Field of Classification Search ................. 702/150, 702/152; 716/21; 700/119
See application file for complete search history.

(56) References Cited
U.S. PATENT DOCUMENTS

| | | | |
|---|---|---|---|
| 5,689,446 A * | 11/1997 | Sundman et al. | 702/167 |
| 5,988,862 A | 11/1999 | Kacyra et al. | |
| 6,982,710 B2 * | 1/2006 | Salomie | 345/420 |
| 7,166,251 B2 | 1/2007 | Blankinship | |
| 2006/0164415 A1 | 7/2006 | Smith et al. | |
| 2006/0290695 A1 | 12/2006 | Salomie | |

* cited by examiner

*Primary Examiner*—Bryan Bui
(74) *Attorney, Agent, or Firm*—Armstrong Teasdale LLP

(57) ABSTRACT

Methods and systems for fabricating a composite structure are provided. The method includes receiving data representing a portion of a surface of the structure, measuring a surface of the structure, the measured surface corresponding to the received surface wherein the measuring is performed with the structure in a flexed condition, and determining a difference in a first and a second direction between the measured surface and the received surface at areas that correspond to the measured surface. The method also includes determining a difference in a third direction, transmitting to a morphing algorithm the determined differences in the first, second, and third directions, and determining a position in the first, second, and third directions of a point on the surface in the flexed condition that corresponds to a respective point on the received surface when the structure is placed in the nominal condition.

22 Claims, 8 Drawing Sheets

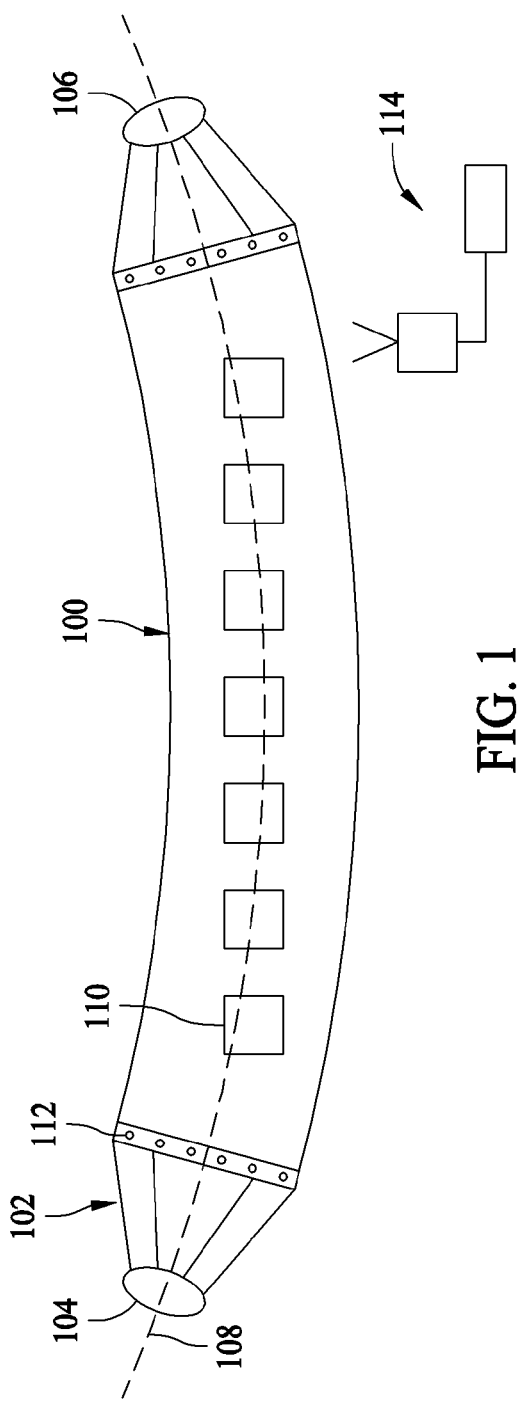
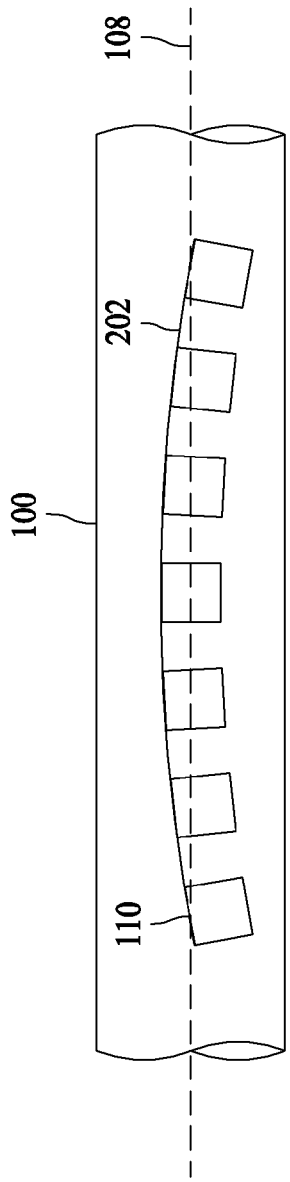

METHODS AND SYSTEMS FOR MANUFACTURING LARGE COMPONENTS

BACKGROUND

Embodiments of the disclosure relate generally to methods and systems for manufacturing large components and more particularly, to methods and systems for forming composite structures to close tolerances.

Manufacturing techniques for assembling large structures from composite material use massive tooling to provide a stable platform to form the structure. Determinant assembly (DA) holes or other indexing features are use to fix locations of the structure relative of points of reference. The DA holes permit accurately ascertaining the location of any point on the structure surface. Such accurate location may be needed when further manufacturing processes are performed on the structure after the initial forming process. Such further processes may include cutting apertures at predetermined locations or milling certain features into the surface of the structure. However, the massive tooling may introduce an amount of sag into the structure that will be removed from the structure when the tooling is disassembled and the structure becomes free standing. For example, an airplane fuselage barrel may be formed of composite material wound around tooling. The tooling may be massive enough to sag between the points of rotation at either end of the tooling. As the structure is formed, it acquires the sag from the tooling. Before the formed barrel is removed from the tooling, typically window, and door apertures and attachment fixtures are cut into the barrel. If the apertures are cut into the barrel in a sag state, the apertures will be mispositioned when the tooling is removed and the barrel conforms to its nominal or unflexed shape.

What are needed are methods and systems for providing accurate placement of apertures and fixtures to manufactured parts that may flex during manufacturing.

SUMMARY

In one embodiment, a computer-implemented method of fabricating a composite structure includes receiving data representing at least a portion of a surface of a model of the structure in a nominal condition, measuring at least a portion of a surface of the structure at a plurality of areas along the surface, the measured portion corresponding to a portion of the surface of the model wherein said measuring is performed with the structure in a flexed condition, determining a difference in a first and a second direction between the measured portion of the structure surface at each of the plurality of areas and the portion of the surface of the model at areas in the model that correspond to the measured areas relative to one or more fixed points observable during the measurement, and determining a difference in a third direction between the measured portion of the structure surface at each of the plurality of points and the portion of the surface of the model at points in the model that correspond to the measured points. The method transmitting to a morphing algorithm the determined differences in the first, second, and third directions, determining a position in the first, second, and third directions of a point on the structure in the flexed condition that corresponds to a respective point on the structure when the structure is placed in the nominal condition; and outputting the determined position.

In yet another embodiment, a system for compensating for variations of a part between an as-built shape relative to a nominal configuration of the part wherein the nominal configuration is predetermined using a model of the part wherein the system includes a database embodied on a computer readable media, said database comprising data relating to the three dimensional shape of a nominal configuration of the part, a non-contact metrology system configured to survey an as-built configuration of the part, the survey comprising measured points corresponding to at least a portion of the data relating to the three dimensional shape of a nominal configuration of the part, and a processor configured to receive data from said database and at least a portion of the as-built configuration from said metrology system. The processor is further configured to define a plurality of nominal plane patches using the received three dimensional shape data from said database, locate points in the survey data that correspond to the three dimensional shape data, determine a positional error between at least one of the plurality of nominal plane patches and the corresponding measured points in two dimensions, determine a positional error in a third dimensions using the positional error is two dimensions, and output the positional errors in three dimensions.

In another embodiment, a computer implemented method of directing automatic tooling includes receiving data representing a shape of a part in a nominal condition, measuring at least a portion of the part surface in an as built configuration using non contact metrology, and determining a positional difference in three dimensions between the measured portion of the part surface and a corresponding surface of the represented shape of the part in the nominal condition. The method further includes transmitting the determined positional difference in three dimensions of each portion to a morphing algorithm, determining a position in the first, second, and third directions of a point on the structure in the flexed condition that corresponds to a respective point on the structure when the structure is placed in the nominal condition, and outputting the determined position.

BRIEF DESCRIPTION OF THE DRAWINGS

FIG. 1 is a side perspective view of an exemplary workpiece that may be fabricated using the methods described herein;

FIG. 2 is a side perspective view of workpiece shown in FIG. 1 in a nominal condition;

DETAILED DESCRIPTION

Figure 3A:
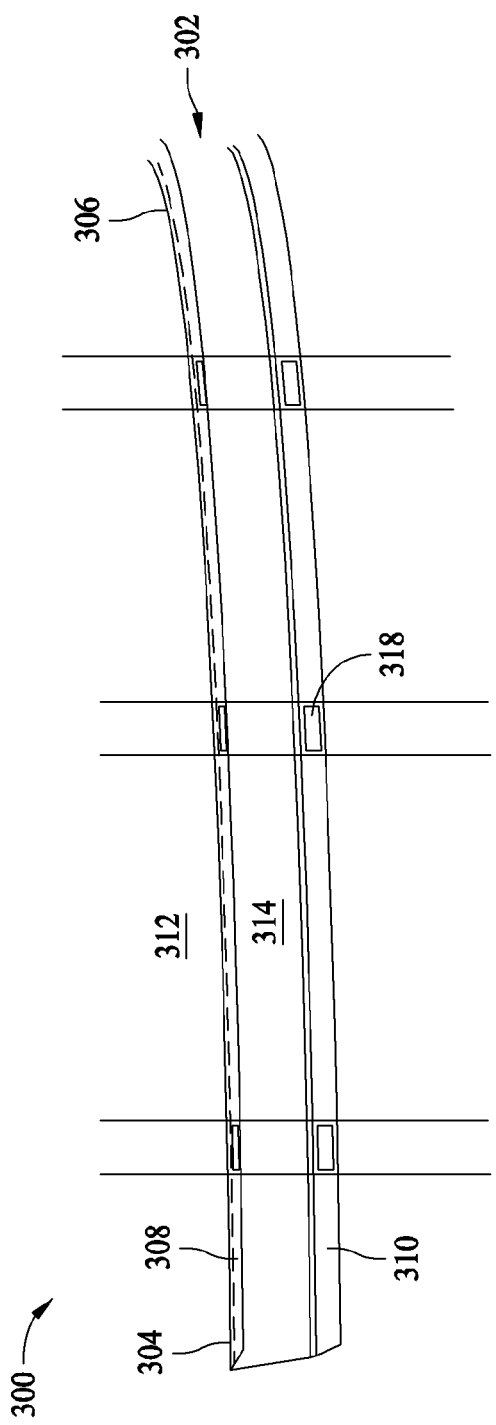
FIG. 3A is a side view of a portion of workpiece that includes a feature to be measured.

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, a process of forming airplane fuselage barrels. However, it is contemplated that this disclosure has general application to manufacturing major components and assemblies where adherence to a specified set of dimensional tolerances is desired, particularly where the weight of the component and/or manufacturing tooling generates a deviation from manufacturing tolerances.

FIG. 1 is a side perspective view of an exemplary workpiece 100 that may be fabricated using the methods described herein. In the exemplary embodiment, workpiece 100 is mounted on massive tooling 102. Tooling 102 is supported at a first end 104 and a second end 106 and is rotatable about a longitudinal axis 108 during the fabrication process. Workpiece 100 is formed by rotating tooling 102 about axis 108 and winding a composite material in the form of for example, a strand, rope, or web about the rotating tooling 102. In an alternative embodiment, workpiece 100 is fabricated by holding tooling 102 stationary and winding the composite material about tooling 102 by traversing a winding assembly circumferentially about an outer periphery of tooling 102. However, because tooling 102 is massive and is supported at ends 104 and 106, tooling 102 and workpiece 100 tend to sag in between ends 104 and 106. The sag illustrated in FIG. 1 is exaggerated for explanation purposes. During a cutting portion of the fabrication process, apertures and/or holes may be cut through workpiece 100. In the exemplary embodiment, workpiece 100 is an aircraft fuselage barrel that will include window apertures 110, door apertures (not shown), and/or mounting holes (not shown) when the fabrication process is completed.

Typically, window apertures 110 in an aircraft fuselage are cut such that the edges of window apertures 110 are aligned along a line on the surface of the fuselage that is substantially parallel to the longitudinal axis of the fuselage. If window apertures 110 are cut while workpiece 100 is in a flexed condition due to sag, window apertures 110 will not be aligned along a line parallel with longitudinal axis 108 when workpiece 100 is in a nominal or unflexed condition.

Determinant assembly (DA) holes 112 are features that are fixed on tooling 102 and are viewable during a measuring process wherein workpiece 100 is measured to determine the positions of selectable predetermined points on workpiece 100 with respect to DA holes 112. Workpiece 100 may be measured using a non-contact metrology system such as an optical metrology system 114. For example, a plurality of light point may be projected onto workpiece 100 and the surface of workpiece 100 may then be measured using photogrammetry techniques. Features associated with the surface of workpiece 100 may also be used to measure the surface of workpiece 100 with respect to DA holes 112 or other component or feature that would provide a reference for measuring workpiece 100. Other surface measurements techniques may be used such as but not limited to ultrasonic, laser light, and radio frequency. In the exemplary embodiment, portions of the surface of workpiece 100 are measured, however in other embodiments the entire surface of workpiece 100 may be measured.

FIG. 2 is a side perspective view of workpiece 100 (shown in FIG. 1) in a nominal condition. In the embodiment illustrated in FIG. 2, apertures 110 are not aligned along a line on the surface of workpiece 100 that is parallel to longitudinal axis 108. Rather, with massive tooling 102 removed, workpiece 100 returns to a nominal condition wherein workpiece 100 is supporting its own weight and is substantially not in a flexed condition. Edges of window apertures 110 are aligned an arcuate line 202 on workpiece 100 that is not parallel to longitudinal axis 108. To avoid such misalignment the method of locating positions on workpiece 100 when in the flexed or sagging condition that correspond to positions on a predetermined model of workpiece 100 in a nominal condition is described herein.

Figure 3B:
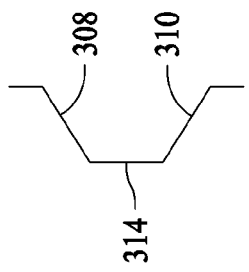
FIG. 3B is an end view of feature shown in FIG. 3A.

FIG. 3A is a side view of a portion of workpiece 100 that includes a feature 302 to be measured. FIG. 3B is an end view of feature 300 (shown in FIG. 3A). In the exemplary embodiment, feature 302 comprises a non-constant dimension stringer trough that extends along workpiece 100 between a first end 304 and a second end 306. Trough 302 includes a first sidewall 308 and a second sidewall 310 that extends between a surface 312 of workpiece 100 and a base 314 of trough 302. Selectable portions or patches of surface 312 and/or trough 302 may be marked for measurement using light or a physical marking of the surfaces such as an edge of a feature. For example, a station cut 316 and sidewall 308 or 310 may bound a patch 318 to be measured. In addition, patch 318 may be bounded by light projections delineating bounding edges of patch 318.

Figure 4:
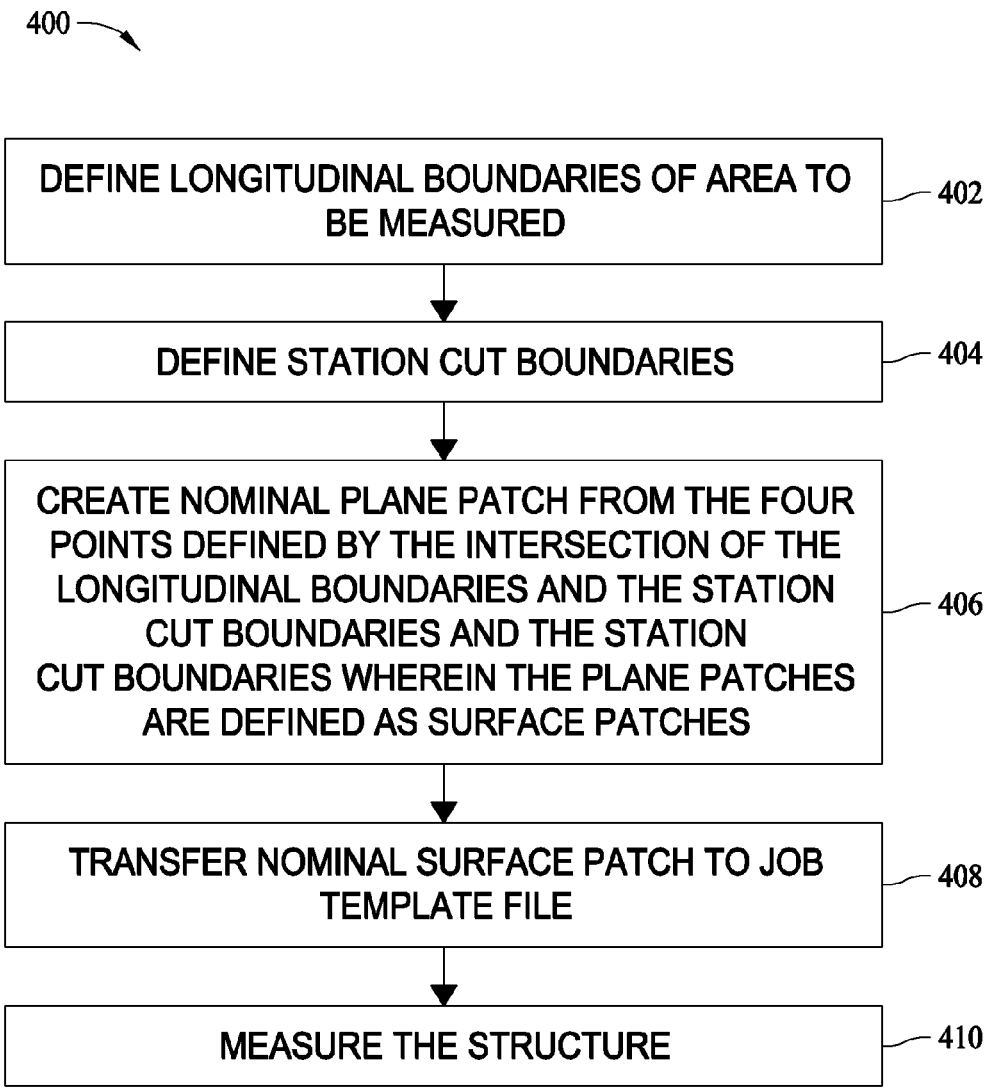
FIG. 4 is a flow chart of an exemplary method of determining position corrections for a workpiece flexed from a nominal condition.

FIG. 4 is a flow chart of an exemplary method 400 of determining position corrections for a workpiece flexed from a nominal condition. In the exemplary embodiment, method 400 generates a nominal surface to which a measured surface is compared. Method 400 includes defining 402 boundaries in a first direction of an area to be measured and defining 404 boundaries in a second direction, for example, a station cut, of an area to be measured. A nominal plane patch is created 406 from the four points defined by the intersection of the boundaries in the first direction and the boundaries in the second direction wherein the plane patches are defined as surface patches. The nominal surface patch is transferred 408 to a job template file. The structure is measured 410 in its flexed condition and the measurement results stored.

Figure 5:
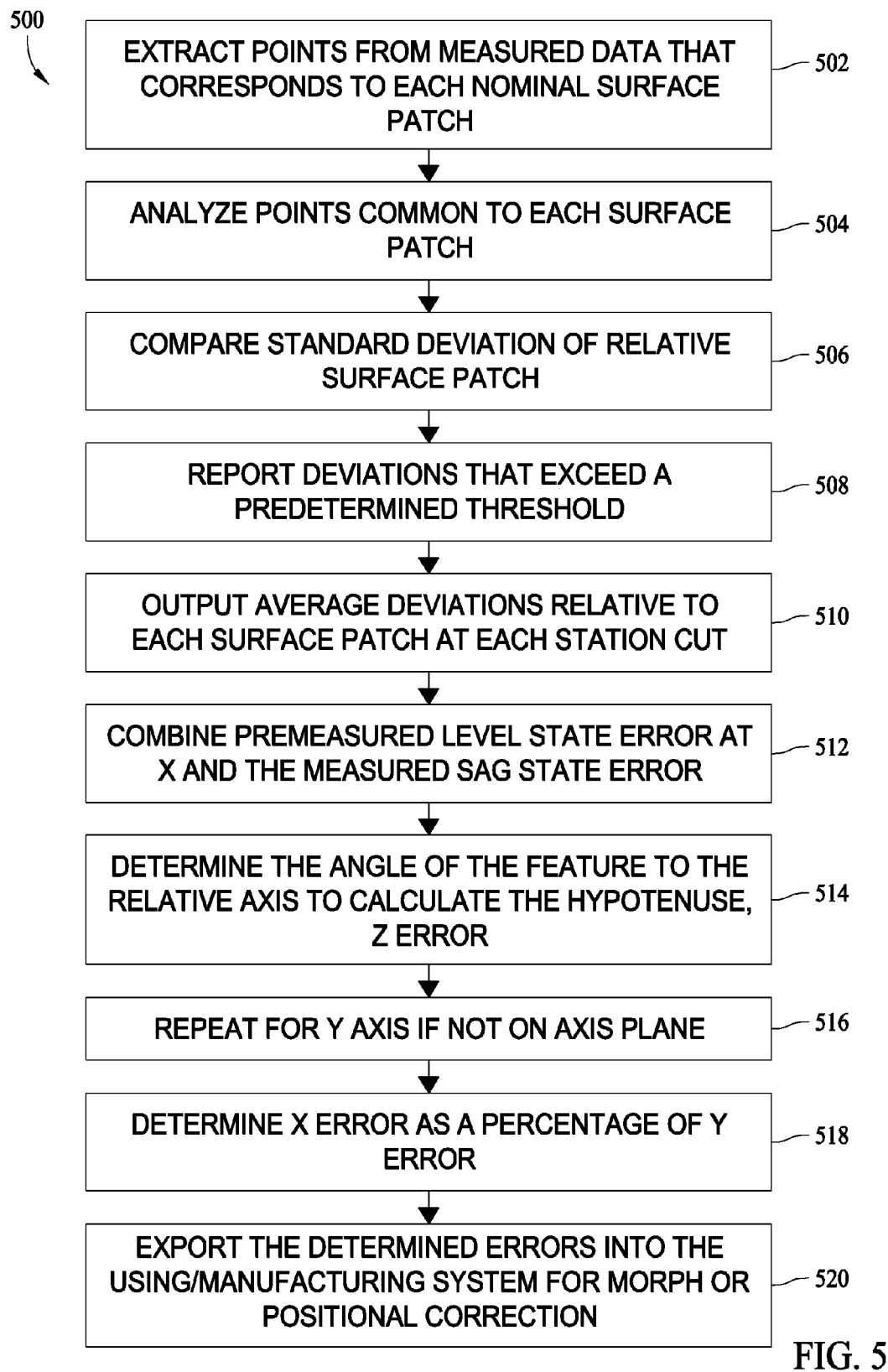
FIG. 5 is a flow chart of an exemplary method of determining position corrections for a workpiece flexed from a nominal condition.

FIG. 5 is a flow chart of an exemplary method 500 of determining position corrections for a workpiece flexed from a nominal condition. In the exemplary patch-to-patch based embodiment, method 500 includes extracting 502 points from measured data that corresponds to each nominal surface patch. Points common to each surface patch are analyzed 504. A standard deviation of each relative surface patch is compared 506 to a predetermined threshold. Deviations that exceed the predetermined threshold are reported 508. Average deviations relative to each surface patch at each station cut are outputted 510. The premeasured level state error at x and the measured sag state error are combined 512. The angle of the feature to the relative axis is determined 514 to calculate the hypotenuse, z error. The angle of the feature to the relative axis is determined 516 for the y-axis if not on the axis plane to calculate the hypotenuse, z error. x error is determined 518 as a percentage of y error. The determined errors are then exported 520 into the using/manufacturing system for morph or positional correction.

Figure 6:
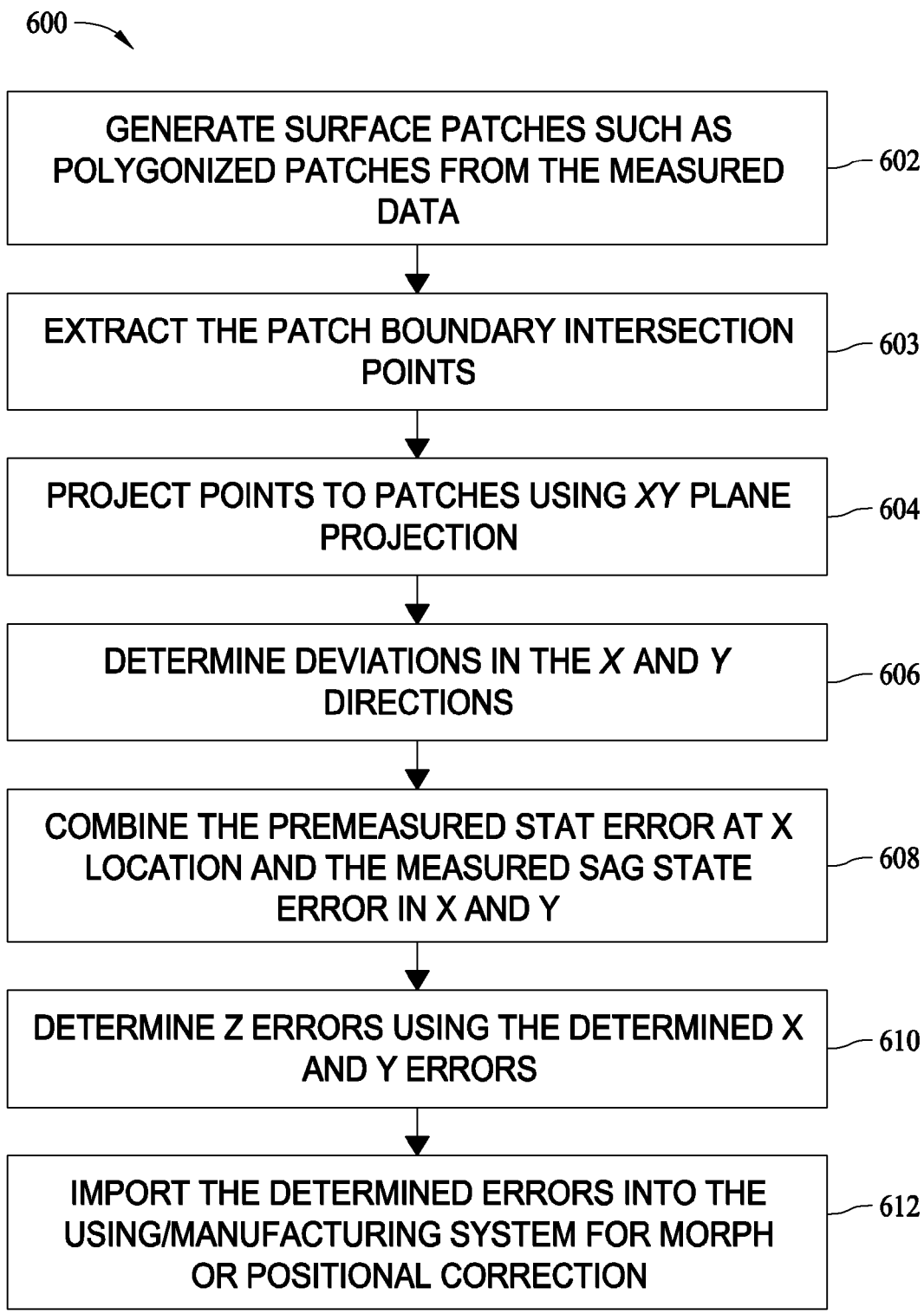
FIG. 6 is a flow chart of another exemplary method of determining position corrections for a workpiece flexed from a nominal condition.

FIG. 6 is a flow chart of another exemplary method 600 of determining position corrections for a workpiece flexed from a nominal condition. In the exemplary point to patch based embodiment, method 600 includes generating 602 surface patches such as polygonized patches from the measured data. The patch boundary intersection points are extracted 603. The points are projected 604 to patches using xy plane projection. Deviations in the x and y directions are determined 606. The premeasured stat error at X location and the measured sag state error in X and Y are combined 608. Z errors are determined 610 using the determined X and Y errors. The determined errors are then exported 612 into the using/ manufacturing system for morph or positional correction.

Figure 7A:
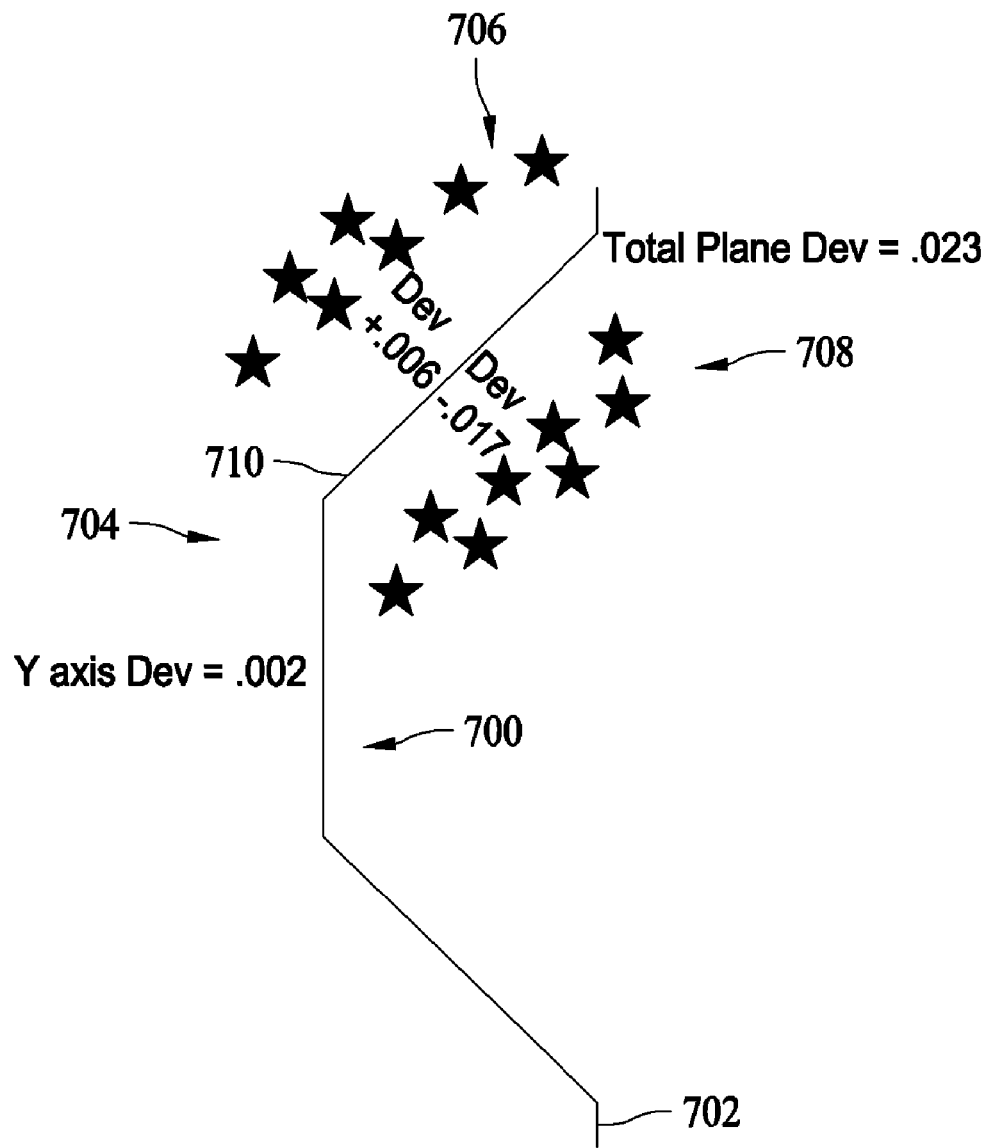
FIG. 7A is an end view of an exemplary workpiece feature illustrating a method of determining the surface deviations at each surface patch section.
Figure 7B:
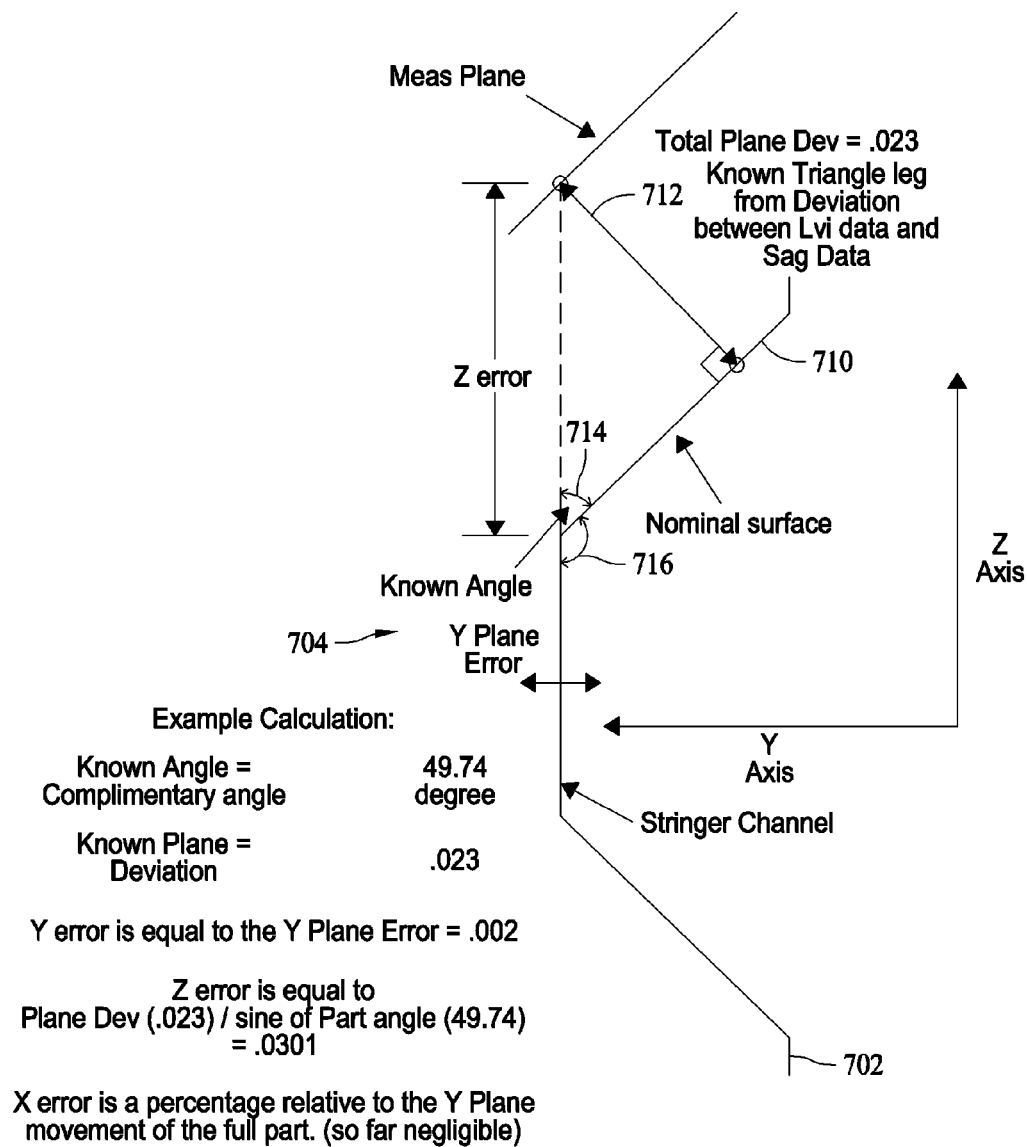
FIG. 7B is an end view of workpiece feature shown in FIG. 7A illustrating a method of determining the Y and Z errors from the surface deviations.

FIG. 7A is an end view of an exemplary workpiece feature 700 illustrating a method of determining the surface deviations at each surface patch section. FIG. 7B is an end view of workpiece feature 700 (shown in FIG. 7A) illustrating a method of determining the Y and Z errors from the surface deviations. In the exemplary embodiment, workpiece feature 700 is a stringer channel extending along a surface 702 of a workpiece 704 such as a fuselage barrel for an aircraft. A level state measured point cloud 706 of points from workpiece 704 is plotted. The level state points are measured in a level state such as when midsections of workpiece 704 are supported. A sag state measured point cloud 706 of points from workpiece 704 is plotted. The sag state points are measured in a sag state such as when midsections of workpiece 704 are not supported. Differences between points in point cloud 706 and a nominal surface 710 of workpiece 704, and points in point cloud 708 and nominal surface 710 are determined. In the exemplary embodiment, points in point cloud 706 deviate from nominal surface 710 by +0.006 and points in point cloud 708 deviate from nominal surface 710 by −0.017 on average. Accordingly, total plane deviation 712 is 0.023.

In the exemplary calculation, a triangle is formed using the known total plane deviation as a known leg. A known angle is a complementary angle of the feature angle. In the exemplary embodiment, angle 714 is approximately 49.74 degrees. In the exemplary embodiment, the Y error is equal to the Y-plane error of 0.002. Z error is determined using total plane deviation 712 divided by the sine of angle 714. In the exemplary embodiment, this Z error equals 0.023/sine(49.74°) or 0.0301. X error is determined as a percentage of the Y plane movement. In the exemplary embodiment, movement along the longitudinal axis (x-direction) is negligible for workpiece 704 between the level state and the sag state. Using the above described error calculation, error values in three dimensions are output to a morphing algorithm to determine cutting locations in a flexed workpiece in a sag state that result in a proper placement of for example, but not limited to windows, doors, and attachment fixtures when the workpiece is in the not flexed or nominal state.

Figure 8:
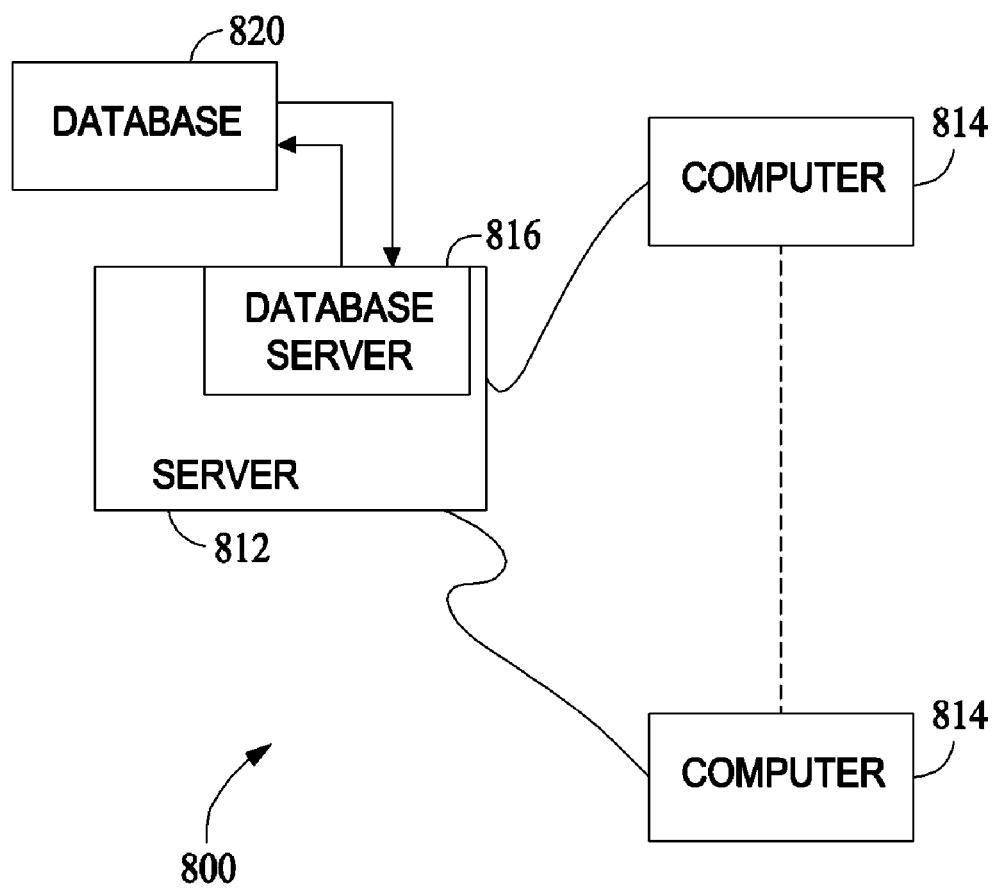
FIG. 8 is a simplified block diagram of a Fabrication Alignment System (FAS) including a server system and a plurality of client sub-systems.

FIG. 8 is a simplified block diagram of a Fabrication Alignment System (FAS) 800 including a server system 812, and a plurality of client sub-systems, also referred to as client systems 814, connected to server system 812. Computerized modeling and measurement tools, as described above, are stored in server 812, and can be accessed by a requester at any one of computers 814. In one embodiment, client systems 814 are computers including a web browser, such that server system 812 is accessible to client systems 814 using the Internet. Client systems 814 are interconnected to the Internet through many interfaces including a network, such as a local area network (LAN) or a wide area network (WAN), dial-in-connections, cable modems, and special high-speed ISDN lines. Client systems 814 could be any device capable of interconnecting to the Internet including a web-based phone, personal digital assistant (PDA), or other web-based connectable equipment. A database server 816 is connected to a database 820 containing information on a variety of matters, as described above. In one embodiment, centralized database 820 is stored on server system 812 and can be accessed by potential users at one of client systems 814 by logging onto server system 812 through one of client systems 814. In an alternative embodiment, database 820 is stored remotely from server system 812 and may be non-centralized.

The above-described methods of forming composite structural members and composite structures formed thereby are cost-effective and highly reliable. The methods and structures include composite material formed using massive tooling that causing a deflection of the structure from its nominal condition during forming. Such deflection is measured and the amount of deflection between the deflected state and the nominal state is determined in three dimensions. The errors are input into morphing algorithms that orient cutting tools to a position that will be the correct position for windows and doors after the structure returns to its nominal state after the removal of the tooling. Accordingly, the methods and structures facilitate proper location of apertures and attachment members of the structural member in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A computer-implemented method including program instructions stored on a computer readable medium, the program instructions operable for computer control of composite structure fabrication, said program instructions comprising at least one code segment configured for:

receiving data representing at least a portion of a surface of a model of the structure in a nominal condition;

measuring at least a portion of a surface of the structure at a plurality of areas along the surface, the measured portion corresponding to a portion of the surface of the model wherein said measuring is performed with the structure in a flexed condition;

determining a difference in a first and a second direction between the measured portion of the structure surface at each of the plurality of areas and the portion of the surface of the model at areas in the model that correspond to the measured areas relative to one or more fixed points observable during the measurement;

determining a difference in a third direction between the measured portion of the structure surface at each of the plurality of points and the portion of the surface of the model at points in the model that correspond to the measured points;

transmitting to a morphing algorithm the determined differences in the first, second, and third directions;

determining a position in the first, second, and third directions of a point on the structure in the flexed condition that corresponds to a respective point on the structure when the structure is placed in the nominal condition; and outputting the determined position.

2. A computer-implemented method in accordance with claim 1 further comprising a code segment configured for outputting an indication of each determined difference that is outside a predetermined threshold range.

3. A computer-implemented method in accordance with claim 1 wherein said morphing algorithm comprises a polygonal mesh.

4. A computer-implemented method in accordance with claim 1 wherein said determining a difference in a third direction comprises determining a difference in a third direction based on the determined differences in the first and second directions.

5. A computer-implemented method in accordance with claim 1 wherein said measuring at least a portion of a surface of the structure comprises surveying at least a portion of a surface of the structure utilizing optical metrology.

6. A computer-implemented method in accordance with claim 1 wherein said outputting the determined position comprises outputting the determined position to a cutting machine configured to form apertures through the surface of the structure.

7. A computer-implemented method in accordance with claim 1 wherein said determining a difference in a third direction comprises generating a geometric shape with known elements from the measured at least a portion of a surface of the structure.

8. A computer-implemented method in accordance with claim 1 wherein outputting an indication of each determined difference that is outside a predetermined threshold range comprises determining a standard deviation of each determined difference.

9. A system for compensating for variations of a part between an as-built shape relative to a nominal configuration of the part wherein the nominal configuration is predetermined using a model of the part, said system comprising:
   a database embodied on a computer readable media, said database comprising data relating to the three dimensional shape of a nominal configuration of the part;
   a non-contact metrology system configured to survey an as-built configuration of the part, the survey comprising measured points corresponding to at least a portion of the data relating to the three dimensional shape of a nominal configuration of the part; and
   a processor configured to receive data from said database and at least a portion of the as- built configuration from said metrology system and then:
      define a plurality of nominal plane patches using the received three dimensional shape data from said database;
      locate points in the survey data that correspond to the three dimensional shape data;
      determine a positional error between at least one of the plurality of nominal plane patches and the corresponding measured points in two dimensions;
      determine a positional error in a third dimension using the positional error in two dimensions; and
      output the positional errors in three dimensions.

10. A system in accordance with claim 9 wherein said part comprises an aircraft fuselage barrel and said database comprises data defining an outline of at least one of a window and a door, wherein the outline of the at least one of a window and a door are non planar.

11. A system in accordance with claim 10 wherein the outline comprises at least one developed curve.

12. A system in accordance with claim 9 wherein said processor is configured to execute a morphing algorithm using the positional errors in three dimensions to generate dimensional instructions for further fabrication.

13. A system in accordance with claim 12 wherein said processor is configured to generate dimensional instructions for a powered machine tool, the powered machine tool configured to selectively remove portions of the part such that the part substantially conforms to the nominal configuration of the part stored in the database.

14. A system in accordance with claim 9 wherein said non-contact metrology system comprises an optical metrology system.

15. A system in accordance with claim 9 wherein said processor is further configured to define a plurality of nominal plane patches using a polygonized mesh.

16. A computer-implemented method including program instructions stored on a computer readable medium, the program instructions operable for computer control of automatic tooling direction, said program instructions comprising at least one code segment configured for:
   receiving data representing a shape of a part in a nominal condition;
   measuring at least a portion of the part surface in an as built configuration using non contact metrology;
   determining a positional difference in three dimensions between the measured portion of the part surface and a corresponding surface of the represented shape of the part in the nominal condition;
   transmitting the determined positional difference in three dimensions of each portion to a morphing algorithm;
   determining a position in the first, second, and third directions of a point on the structure in the flexed condition that corresponds to a respective point on the structure when the structure is placed in the nominal condition; and
   outputting the determined position.

17. A computer-implemented method in accordance with claim 16 further comprising at least one code segment configured for outputting an indication of each determined difference that is outside a predetermined threshold range.

18. A computer-implemented method in accordance with claim 16 wherein said morphing algorithm comprises a polygonal mesh.

19. A computer-implemented method in accordance with claim 16 wherein said determining a positional difference in three dimensions comprises determining a difference in a third direction based on the determined differences in a first and a second directions.

20. A computer-implemented method in accordance with claim 16 wherein said measuring at least a portion of the part surface in an as built configuration using non contact metrology comprises measuring at least a portion of a surface of the structure utilizing optical metrology.

21. A computer-implemented method in accordance with claim 16 wherein said outputting the determined position comprises outputting the determined position to a cutting machine configured to form apertures through the surface of the structure.

22. A computer-implemented method in accordance with claim 16 wherein outputting an indication of each determined difference that is outside a predetermined threshold range comprises determining a standard deviation of each determined difference.

* * * * *